Patented May 30, 1933

1,911,714

UNITED STATES PATENT OFFICE

GEORG RÖSCH, OF COLOGNE-MULHEIM-ON-THE-RHINE, GERMANY, ASSIGNOR TO GENERAL ANILINE WORKS, INC., OF NEW YORK, N. Y., A CORPORATION OF DELAWARE

VAT DYESTUFFS OF THE ANTHRAQUINONE SERIES

No Drawing. Application filed April 14, 1931, Serial No. 530,146, and in Germany August 8, 1929.

The present invention relates to a process of preparing vat dyestuffs of the anthraquinone series and to new products obtainable by said process.

In accordance with the invention, vat dyestuffs of good fastness properties are obtainable by causing condensation of two molecular proportions of alpha-amino-anthraquinone or an aroylamino- or alkoxy substitution product thereof with one molecular proportion of a reactive derivative of a dicarboxylic acid of an aromatic polycyclic hydrocarbon, more particularly of a dihalide or diester of a naphthalene dicarboxylic acid, diphenyl-para-para'-dicarboxylic acid or diphenylmethane dicarboxylic acid, which compounds may be substituted by halogen atoms, alkyl- or alkoxy groups, such dicarboxylic acids being excepted as are capable of forming internal anhydrides.

The reaction is advantageously effected by heating the reaction components in the presence of a suitable organic solvent, such as nitrobenzene, ortho dichlorobenzene or the like, preferably at the boiling temperature of the reaction mixture.

The new dyestuffs are generally distinguished from the known beta-naphthoyl-alpha-aminoanthraquinones or from the condensation products of aminoanthraquinones with diphenyl-meta-meta' dicarboxylic acid by a better capacity for being absorbed by the fibre, by improved dyeing power and by the fact that they yield dyeings fast to kier boiling.

The testing standards applied in order to prove the fastness to kier boiling of the dyestuffs in question have been as follows:—

(a) One part of the dyed fibre and one part of undyed cotton thread are interlaced and boiled for a period of 4 hours at 1½ atm. pressure in a solution containing in one liter of water 4 ccs. of caustic soda sol. 40° Bé. and 4 grams of the sodium salt of nitrobenzene-sulfonic acid (40 parts of the solution to one part of the material to be tested).

(b) The same as (a) but without the addition of sodium nitrobenzene-sulfonate.

The new dyestuffs probably correspond to the formula

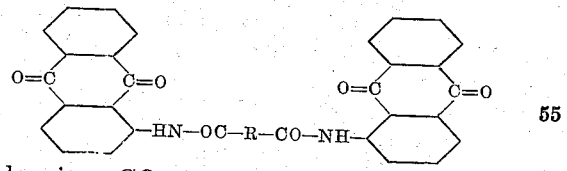

wherein —CO—R—CO— means the residue of a naphthalene-, diphenylmethane- or diphenyl-para-para'-dicarboxylic acid, the nuclei of which may be substituted by halogen, alkyl- or alkoxy groups, and wherein the anthraquinone nuclei may be substituted by aroylamino- or alkoxy groups, preferably benzoylamino- or methoxy groups. They form yellow to red powders, difficultly soluble in the usual organic solvents, dissolving in strong sulfuric acid with a yellow coloration, dyeing cotton from a brown to blue alkaline hydrosulfite vat strong yellow to bluish-red shades of good fastness properties.

The following examples illustrates the invention without, however, restricting it thereto:—

Example 1

137 parts by weight of 1-amino-5-benzoyl-aminoanthraquinone and 55 parts by weight of naphthalene-1.5-dicarboxylic acid dichloride are heated to boiling for a short time in 2000 parts by weight of nitrobenzene. The dyestuff separates as a golden yellow crystalline precipitate in a very good yield. It is filtered with suction, washed with alcohol, and dried. The dyestuff is difficultly soluble in organic solvents, such as alcohol, glacial acetic acid, chlorobenzene and nitrobenzene. It dissolves in concentrated sulfuric acid with an orange yellow coloration.

From its red alkaline hydrosulfite vat wool and cotton are dyed bright yellow shades of good fastness properties.

Example 2

When using in the above examples instead of 1-amino-5-benzoyl-aminoanthraquinone the corresponding quantity of 1-amino-4-methoxyanthraquinone, a dyestuff is obtained, which dyes cotton orange shades of very good fastness properties.

Example 3

When using in Example 1 instead of 1-amino-5-benzoyl-aminoanthraquinone the corresponding quantity of 1-aminoanthraquinone, a yellow dyestuff is obtained, which dyes more greenish shades than the dyestuff obtainable according to Example 1.

Example 4

68.5 parts by weight of 1-amino-5-benzoyl-aminoanthraquinone and 25 parts by weight of naphthalene-1.4-dicarboxylic acid dichloride are heated to boiling for a short time in 1500 parts by weight of dichlorobenzene. The dyestuff being precipitated in a good yield is filtered with suction, washed with alcohol and dried. It forms a yellowish colored crystalline product, which dissolves in concentrated sulfuric acid with an orange-red coloration. It is difficultly soluble in organic solvents. From its violet alkaline hydrosulfite vat animal and vegetable fibres are dyed clear yellow shades of excellent fastness properties.

Example 5

When using in Example 4 instead of the 1-amino-5-benzoyl-aminoanthraquinone the corresponding quantity of 1-amino-4-methoxy-anthraquinone a dyestuff is obtained, in a very good yield, which dyes textile fibres fast orange shades.

Example 6

When using in Example 4 instead of 1-amino-5-benzoylaminoanthraquinone the corresponding quantity of alpha-aminoanthraquinone, a yellow dyestuff is obtained, which dyes cotton more greenish shades than the dyestuff obtainable according to Example 4.

Example 7

446 parts by weight of alpha-aminoanthraquinone are boiled gently with 3000 parts by weight of nitrobenzene and 250 parts by weight of naphthalene-2.6-dicarboxylic acid dichloride, while stirring, until no more unchanged alpha-aminoanthraquinone is present. After cooling, the reaction product is filtered and washed. The dyestuff is a yellow crystalline powder, which is hardly soluble in nitrobenzene, even on heating, and which dyes vegetable fibres from the cold or hot violet alkaline hydrosulfite vat violet-black shades, which after oxidation are converted into a powerful and vivid greenish-yellow of excellent fastness properties.

The naphthalene-2.6-dicarboxylic acid dichloride, which has not hitherto been described, is obtained from naphthalene-2.6-dicarboxylic acid (Berichte der deutschen chemischen Gesellschaft, vol. 9, page 606) in the customary manner, for example, by the action of two molecules of phosphorous pentachloride. It crystallizes from benzene in long yellowish needles, which melt at 187° C.

Example 8

506 parts by weight of 4-methoxy-1-aminoanthraquinone are heated to boiling with 3000 parts by weight of nitrobenzene and 250 parts by weight of naphthalene-2.6-dicarboxylic acid dichloride or -bromide while stirring, until the reaction is complete. The orange-red product, which separates, is isolated in the customary manner. It dyes cotton from a reddish-brown hydrosulfite vat after hanging a clear powerful orange of very satisfactory fastness properties.

The naphthalene-2.6-dicarboxylic acid dibromide, which may likewise be employed in this example, can be prepared by heating naphthalene-2.6-dicarboxylic acid with phosphorous tribromide in trichlorobenzene or nitrobenzene solution. The product crystallizes from trichlorobenzene in yellowish needles, melting above 300° C. with decomposition.

Example 9

446 parts by weight of alpha-aminoanthraquinone are heated to gentle boiling, while stirring, with 3000 parts by weight of nitrobenzene and 250 parts by weight of naphthalene-2.7-dicarboxylic acid dichloride, until unchanged alpha-aminoanthraquinone is no longer present. After cooling, the reaction product is filtered by suction and washed. The dyestuff is a yellow crystalline powder, which is scarcely soluble in hot nitrobenzene, and which dyes the vegetable fibre in dark brown shades from the cold or hot dark brown alkaline hydrosulfite vat. The dyeings, on oxidation, are converted into powerful and vivid greenish-yellow shades of excellent fastness properties.

Naphthalene-2.7-dicarboxylic acid chloride is obtained in the customary manner from naphthalene-2.7-dicarboxylic acid, for example, by the action of two molecular proportions of phosphorous pentachloride and crystallizes from benzene in long, colorless needles, melting at 146° C.

Example 10

506 parts by weight of 4-methoxy-1-aminoanthraquinone are heated to boiling while stirring with 3000 parts by weight of nitrobenzene and 250 parts by weight of naphthalene-2.7-dicarboxylic acid dichloride until conversion is complete. The orange colored product which separates is isolated in the customary manner and yields on cotton from a reddish-brown alkaline hydrosulfite vat after oxidation a clear, powerful orange of good fastness properties.

*Example 11*

686 parts by weight of 4-benzoylamino-1-aminoanthraquinone are heated to boiling while stirring with 3000 parts by weight of nitrobenzene and 250 parts by weight of naphthalene-2.7-dicarboxylic acid dichloride until conversion is complete. The red product, which separates, is isolated in the customary manner and yields on cotton from a blue hydrosulfite vat after oxidation a powerful red of good fastness properties.

*Example 12*

446 parts by weight of alpha-aminoanthraquinone are heated to gentle boiling, while stirring, with 3000 parts by weight of nitrobenzene and 250 parts by weight of naphthalene-1.7-dicarboxylic acid dichloride, until unchanged alpha-aminoanthraquinone is no longer present. After cooling, filtering by suction and washing, a yellow crystalline powder is obtained, which is scarcely soluble even in hot nitrobenzene. From the cold or hot dark brown hydrosulfite vat it dyes vegetable fibres dark brown shades, which after oxidation are converted into a powerful and vivid greenish-yellow of excellent fastness properties.

*Example 13*

446 parts by weight of alpha-aminoanthraquinone are heated to gentle boiling, while stirring, with 3000 parts by weight of nitrobenzene and 242 parts by weight of diphenyl-4.4'-dicarboxylic acid dichloride, until unchanged alpha-aminoanthraquinone is no longer present. After cooling, filtering by suction and washing, the dyestuff is a yellow crystalline powder, which is scarcely soluble even in hot nitrobenzene; it dyes vegetable fibres from the cold or hot bordeaux colored alkaline hydrosulfite vat bordeaux-red shades, which after oxidation are converted into a powerful and vivid greenish-yellow of excellent fastness properties.

*Example 14*

446 parts by weight of alpha-aminoanthraquinone are heated to gentle boiling, while stirring, with 3000 parts by weight of nitrobeneze and 311 parts by weight of 3.3'-dichlorodiphenyl-4.4'-dicarboxylic acid dichloride, until unchanged alpha-aminoanthraquinone is no longer present. After cooling, filtering by suction and washing, a yellow crystalline powder is obtained, which is scarcely soluble even in hot nitrobenzene. It dyes vegetable fibres from the cold or hot bordeaux colored hydrosulfite vat bordeaux-red shades, which after oxidation are converted into a powerful and vivid greenish-yellow of excellent fastness properties.

*Example 15*

10 parts by weight of the dichloride of diphenylmenthane-para-para'-dicarboxylic acid and 15.4 parts by weight of alpha-aminoanthraquinone are boiled in nitrobenzene solution, until the formation of the dyestuff is complete. The new dyestuff dyes cotton from an alkaline hydrosulfite vat strong yellow shades of good fastness properties, especially to kier boiling, light and soaping.

*Example 16*

279 parts by weight of biphenyl-4.4'-dicarboxylic acid dichloride are heated to boiling, while stirring, with 684 parts by weight of 1-amino-5-benzoylamino-anthraquinone in 3000 parts by weight of nitrobenzene. The yellow colored product, which separates, is isolated in the usual manner. It dyes cotton from a blue hydrosulfite vat golden yellow shades of good fastness properties.

When substituting in the above example the 279 parts by weight of biphenyl-4.4'-dicarboxylic acid dichloride by 253 parts by weight of naphthalene-2.6- or 2.7-dicarboxylic acid dichloride, valuable yellow vat dyestuffs are likewise obtained.

This is a continuation in part of my copending application Serial No. 472,493 filed August 1, 1930.

I claim:—

1. The new vat dyestuffs of the general formula:—

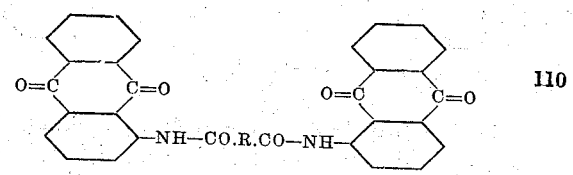

wherein —CO.R.CO— stands for the residue of a dicarboxylic acid of the group consisting of naphthalene-, diphenylmethane dicarboxylic acids, para-para'-diphenyldicarboxylic acid and such substitution products thereof, as are substituted by halogen, alkyl- or alkoxy groups, and wherein the anthraquinone nuclei may be substituted by benzoylamino- or methoxy groups, said dyestuffs forming yellow to red powders, nearly insoluble in the usual organic solvents, soluble in strong sulfuric acid with a yellow coloration, dyeing cotton from a brown to blue alkaline hydrosulfite vat yellow to bluish-red shades of good fastness properties.

2. The new vat dyestuffs of the probable formula:

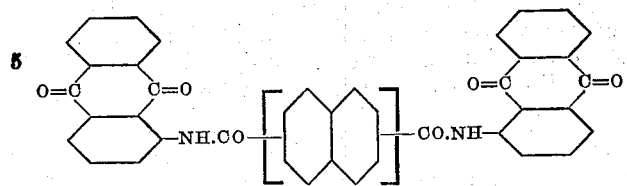

wherein the anthraquinone nuclei may be substituted by benzoylamino- or methoxy groups, said dyestuffs being yellow to red powders, difficultly soluble in the usual organic solvents, soluble in strong sulfuric acid with a yellow coloration, dyeing cotton from a brown to blue hydrosulfite vat yellow to bluish-red shades of good fastness properties.

3. The new vate dyestuffs of the probable general formula:—

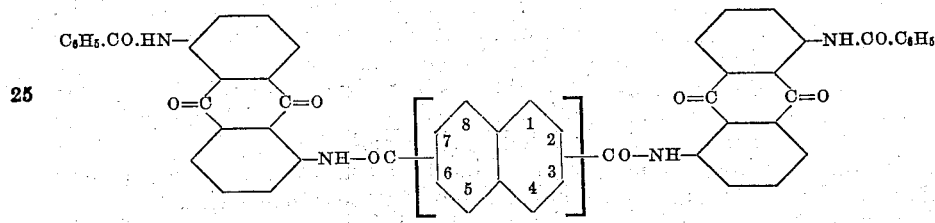

wherein the —CO—NH— groups are attached to the naphthalene nucleus in 1.4- or 1.5- position, said dyestuffs dyeing cotton from an alkaline hydrosulfite vat yellow shades of excellent fastness properties.

4. The new vat dyestuff of the probable formula:—

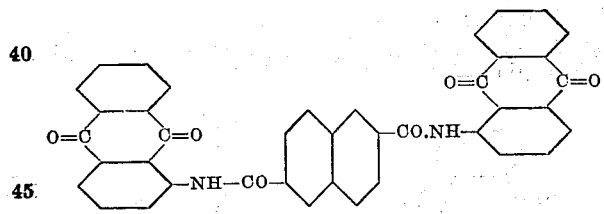

said dyestuff dyeing cotton from a violet alkaline hydrosulfite vat vivid greenish-yellow shades of excellent fastness properties.

5. A new vat dyestuff of the probable formula:—

said dyestuff dyeing cotton from a blue hydrosulfite vat golden yellow shades of good fastness properties.

GEORG RÖSCH.